US006668537B1

(12) United States Patent
Hays

(10) Patent No.: US 6,668,537 B1
(45) Date of Patent: Dec. 30, 2003

(54) HEAT RECOVERY SYSTEM

(76) Inventor: Lance G. Hays, 2737 Ridgepine, La Crescenta, CA (US) 91294

( * ) Notice: Subject to any disclaimer, the term of this patent is extended or adjusted under 35 U.S.C. 154(b) by 0 days.

(21) Appl. No.: 09/966,206

(22) Filed: Sep. 26, 2001

(51) Int. Cl.[7] ................................................ F02C 6/18
(52) U.S. Cl. ................................ 60/39.182; 165/145
(58) Field of Search .................. 60/39.182; 122/7 R; 165/145

(56) References Cited

U.S. PATENT DOCUMENTS

| 4,288,979 A | * | 9/1981 | Liljedahl et al. | ......... 60/39.182 |
| 4,519,207 A | * | 5/1985 | Okabe et al. | ............ 60/39.182 |
| 4,841,722 A | * | 6/1989 | Bjorge | ..................... 60/39.182 |
| 4,891,937 A | * | 1/1990 | Noguchi et al. | ......... 60/39.182 |
| 4,989,405 A | * | 2/1991 | Duffy et al. | ............. 60/39.182 |
| 4,998,408 A | * | 3/1991 | Wiekmeijer | .............. 60/39.182 |
| 5,203,160 A | * | 4/1993 | Ozono | ..................... 60/39.182 |
| 5,267,434 A | * | 12/1993 | Termuehlen et al. | ..... 60/39.182 |
| 5,357,746 A | * | 10/1994 | Myers et al. | ............ 60/39.182 |
| 6,109,020 A | * | 8/2000 | Liebig | ..................... 60/39.182 |
| 6,405,520 B1 | * | 6/2002 | Thiel et al. | .............. 60/39.182 |
| 6,477,842 B1 | * | 11/2002 | Nagata et al. | ........... 60/39.182 |

* cited by examiner

*Primary Examiner*—Michael Koczo
(74) *Attorney, Agent, or Firm*—William W. Haefliger

(57) ABSTRACT

A hot exhaust heat recovery system comprising, in combination a chamber having inlet and outlet porting for flow through of hot exhaust gas, in the chamber interior, separate heat exchanger structures in separate sequential segments said chamber interior, to receive heat transferred from said exhaust gas, said structures receiving pressurized liquid for flow in different paths there-through, to develop vapor streams at different pressures and temperatures without use of boiler drums, the structures having outlets to communicate with a vapor driven turbine or turbines having inlet ports at different inlet fluid pressure zones.

Figure 1:
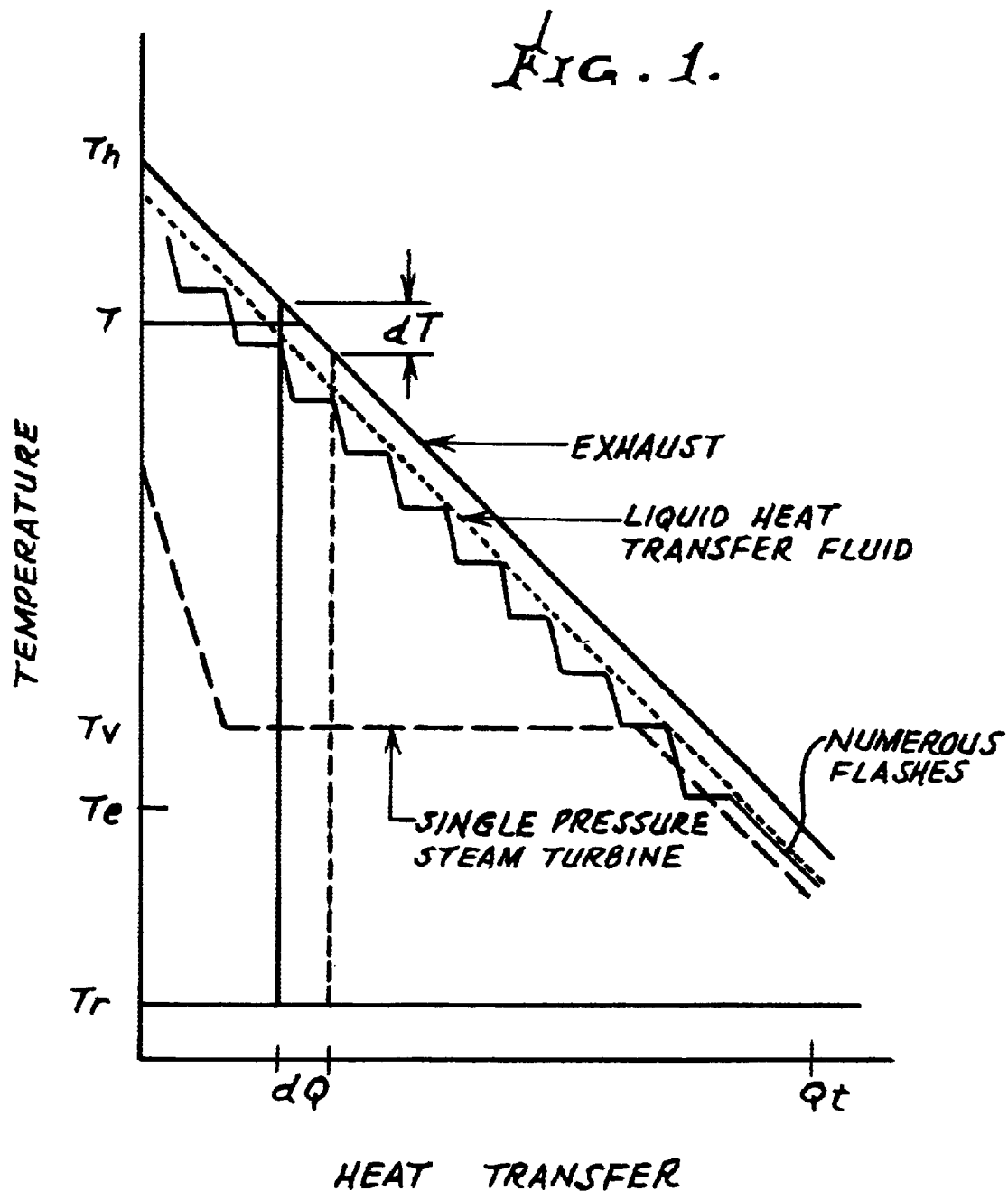

15 Claims, 7 Drawing Sheets

US 6,668,537 B1

HEAT RECOVERY SYSTEM

BACKGROUND OF THE INVENTION

This invention relates generally to recovery of heat from hot gas streams, and more particularly to improvements in heat recovery apparatus whereby efficiency of power production is enhanced.

Systems to generate power from heat in the exhaust of heavy frame gas turbines have been used extensively. The heat is typically used to boil water at one or two pressures and superheat the steam flows. The resulting steam is used to power a steam turbine.

However, application of this conventional technology to aero derivative gas turbines and reciprocating engines, which have lower exhaust gas temperature and flow than heavy frame gas turbines, has been very limited. The reason is that the requirement to boil steam at a constant temperature results in a so called "pinch point" limitation which reduces the thermodynamic efficiency and reduces the amount of exhaust heat which can be utilized for power generation. Application of organic working fluid systems is precluded because the exhaust gas temperature are too high for fluid stability and reasonable conversion efficiency. There is need for means to efficiently utilize this source of wasted energy.

SUMMARY OF THE INVENTION

It is a major object of the invention to provide improved apparatus and methods to meet the above need.

Basically, apparatus embodying the invention comprises:
a) a chamber having inlet and outlet porting for flow through of hot exhaust gas, in the chamber interior,
b) separate heat exchanger structures in the chamber interior, to receive heat transferred from the exhaust gas, the structures receiving pressurized liquid for flow in different paths through the ducts, to develop different pressures and temperatures without use of boiler drums,
c) the arrangement and sizing of the structures being such that they contain and like pressure or pressures of fluid, the fluid caused to flow in side-by-side relation with structures containing different pressures and generally counter-current to the exhaust gas flow,
d) the structures configured such that adjacent structures intercept different fractions of the gas stream,
e) the structures having outlets to communicate with a fluid driven turbine or turbines at different fluid pressure recovery zones.

It is another object to provide said streams from the structures to successively lower pressure zones of the turbine or turbines.

A further object is to provide the structures to extend substantially in parallel in the heat exchanger chamber, and to have different dimensions.

Yet another object is to provide a source of such hot gas, such as an internal combustion engine exhaust stream, in communication with heat exchanger inlet porting, for flow over segments of the structures in sequence, as for example tubing coils. Four such segments of structures of different lengths, may be provided.

These and other objects and advantages of the invention, as well as the details of an illustrative embodiment, will be more fully understood from the following specification and drawings, in which:

DRAWING DESCRIPTION

Figure 2:
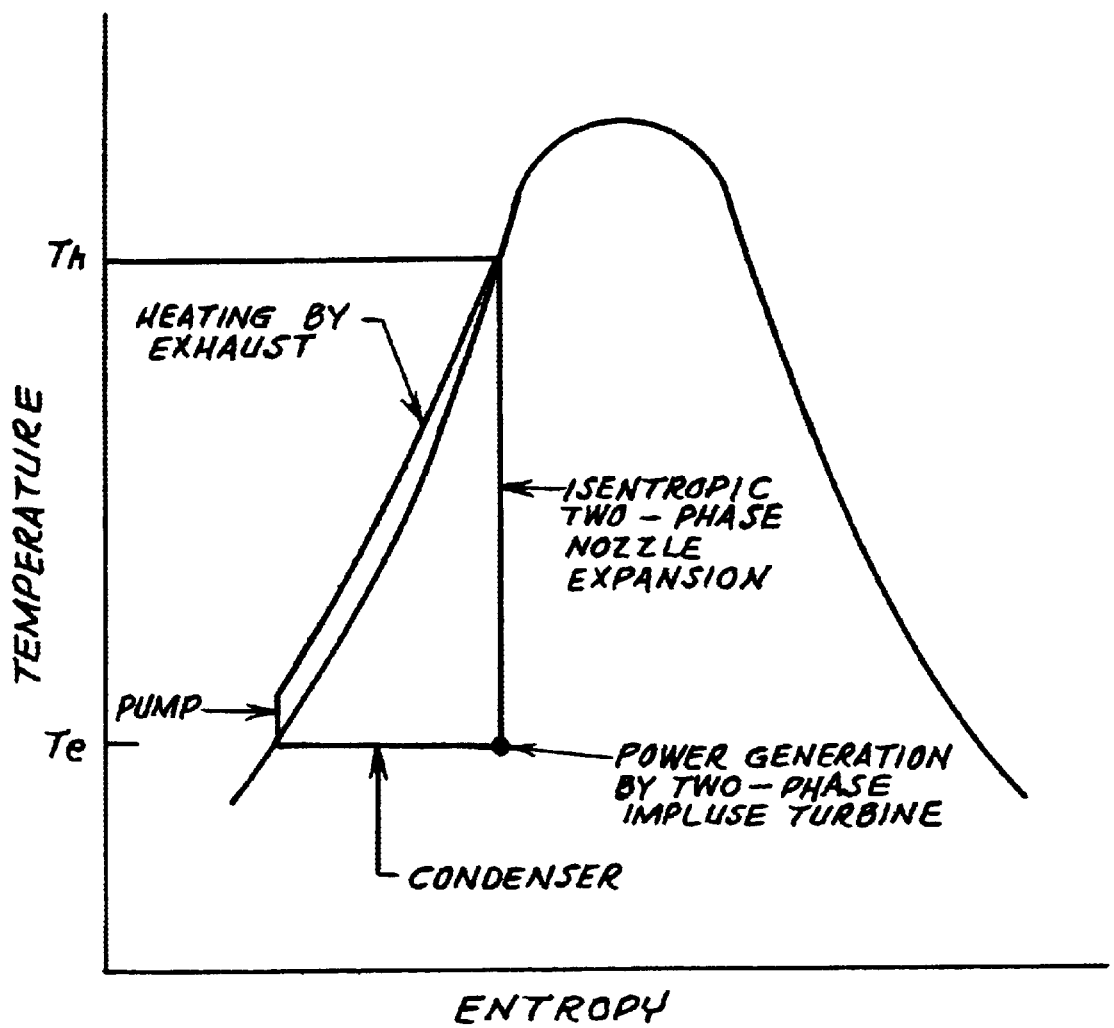
Figure 3:
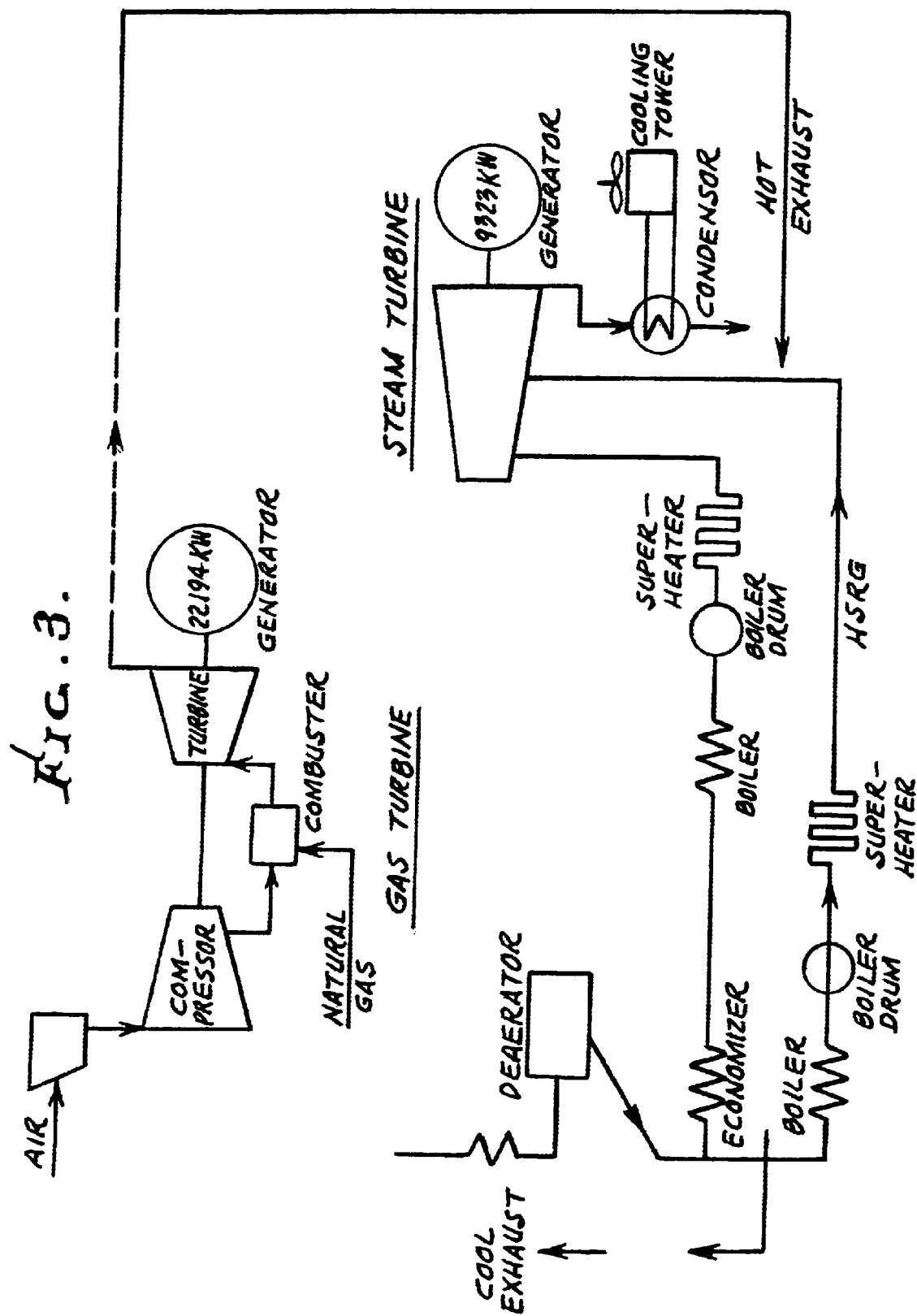
Figure 9:
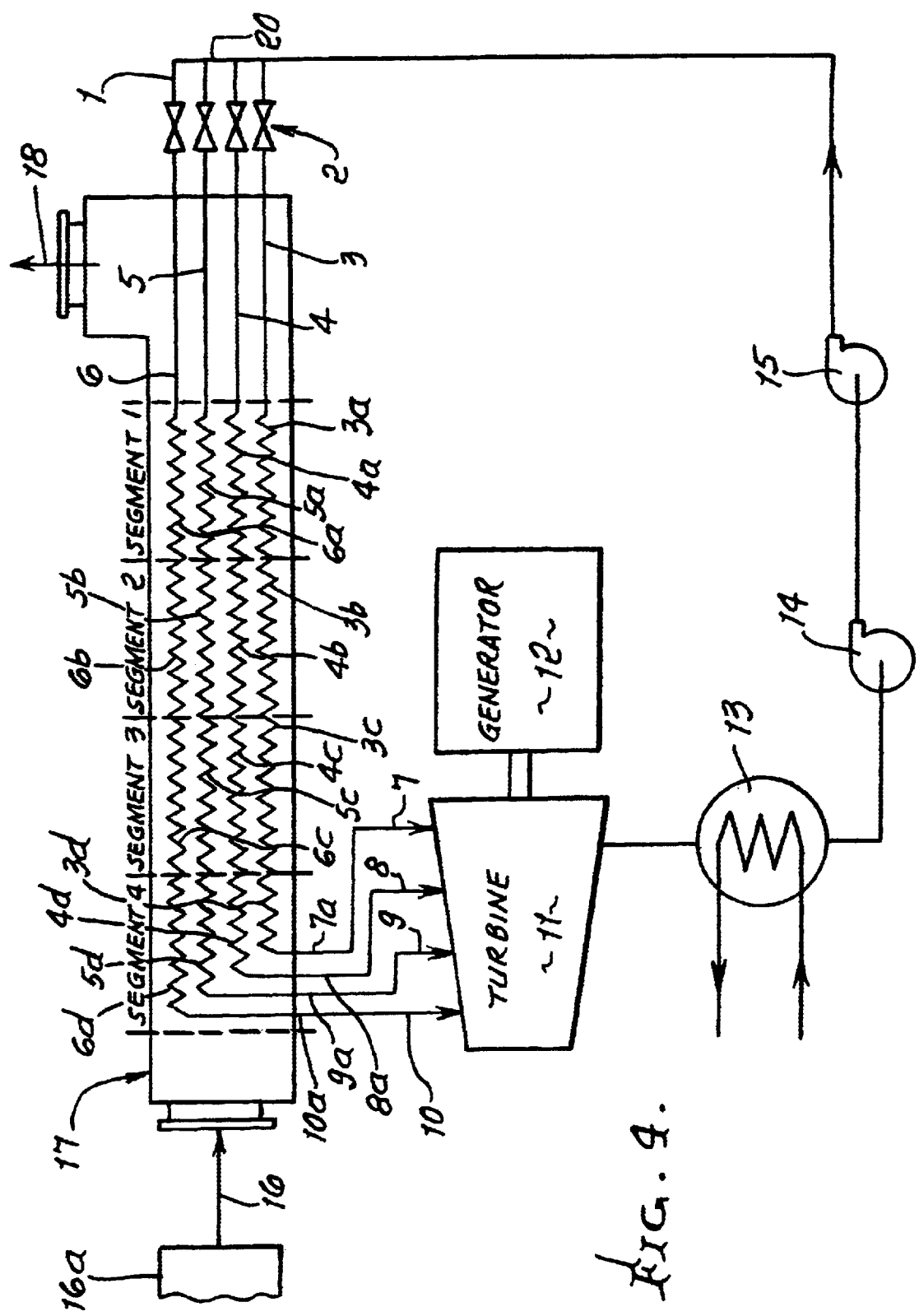
Figure 5:
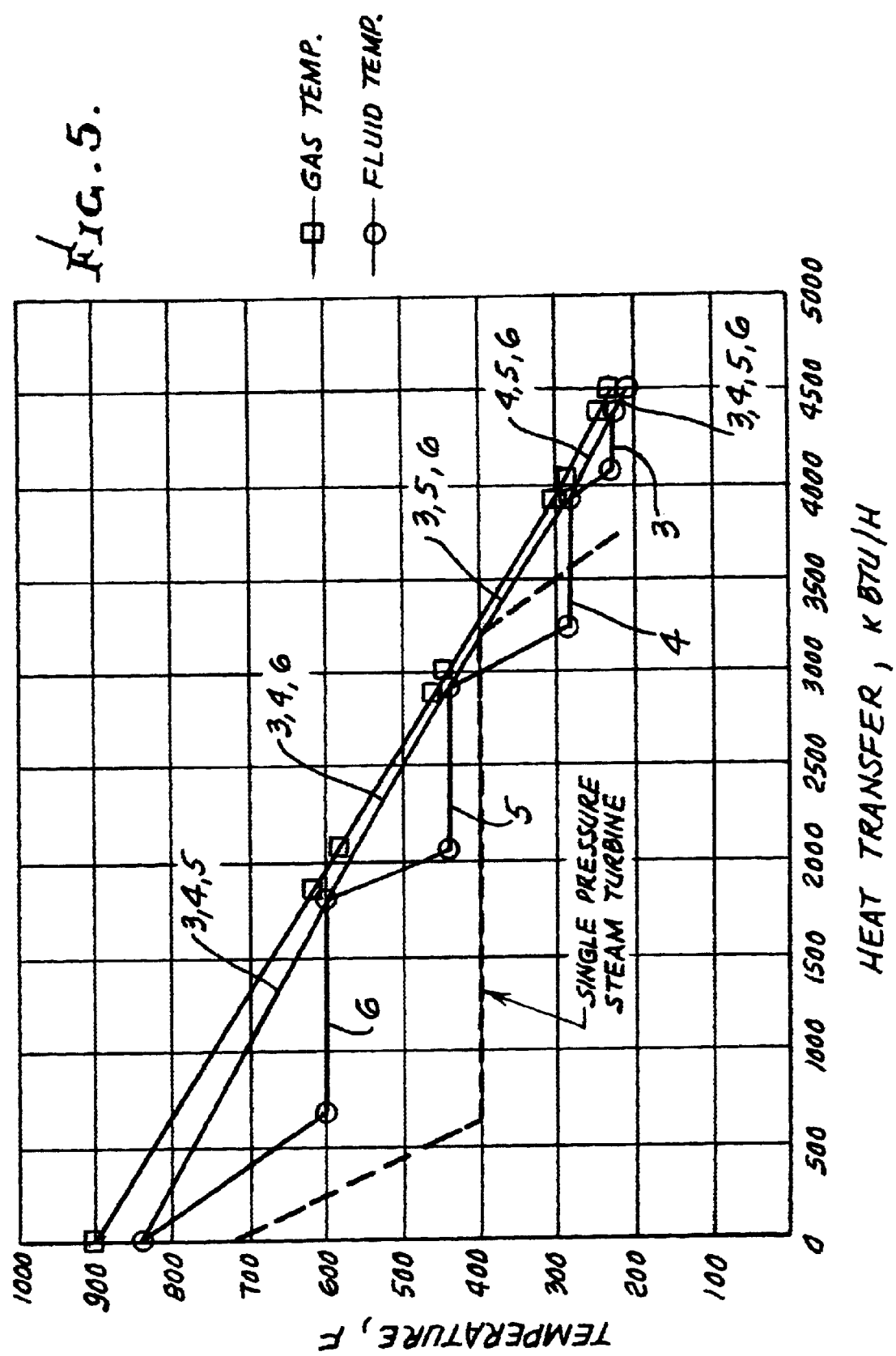
Figure 6A:
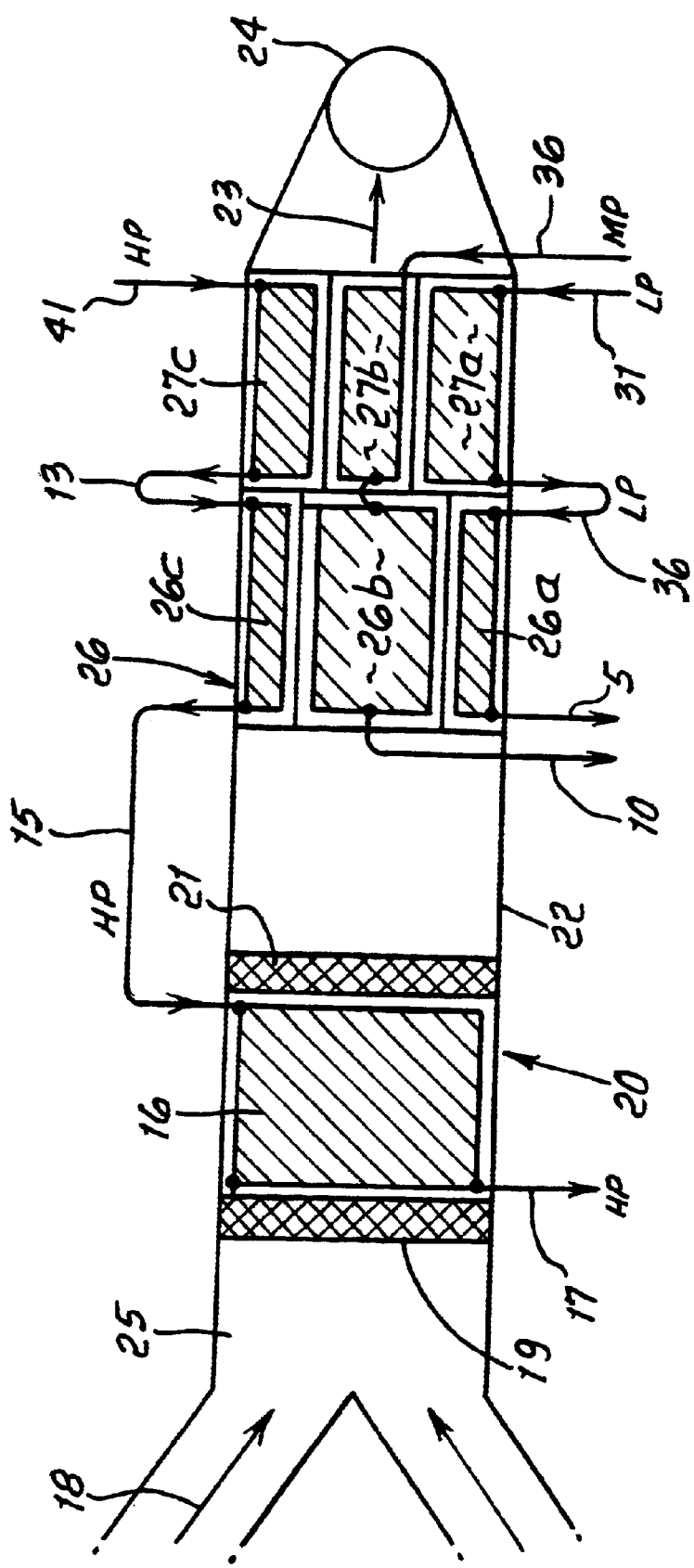
Figure 6B:
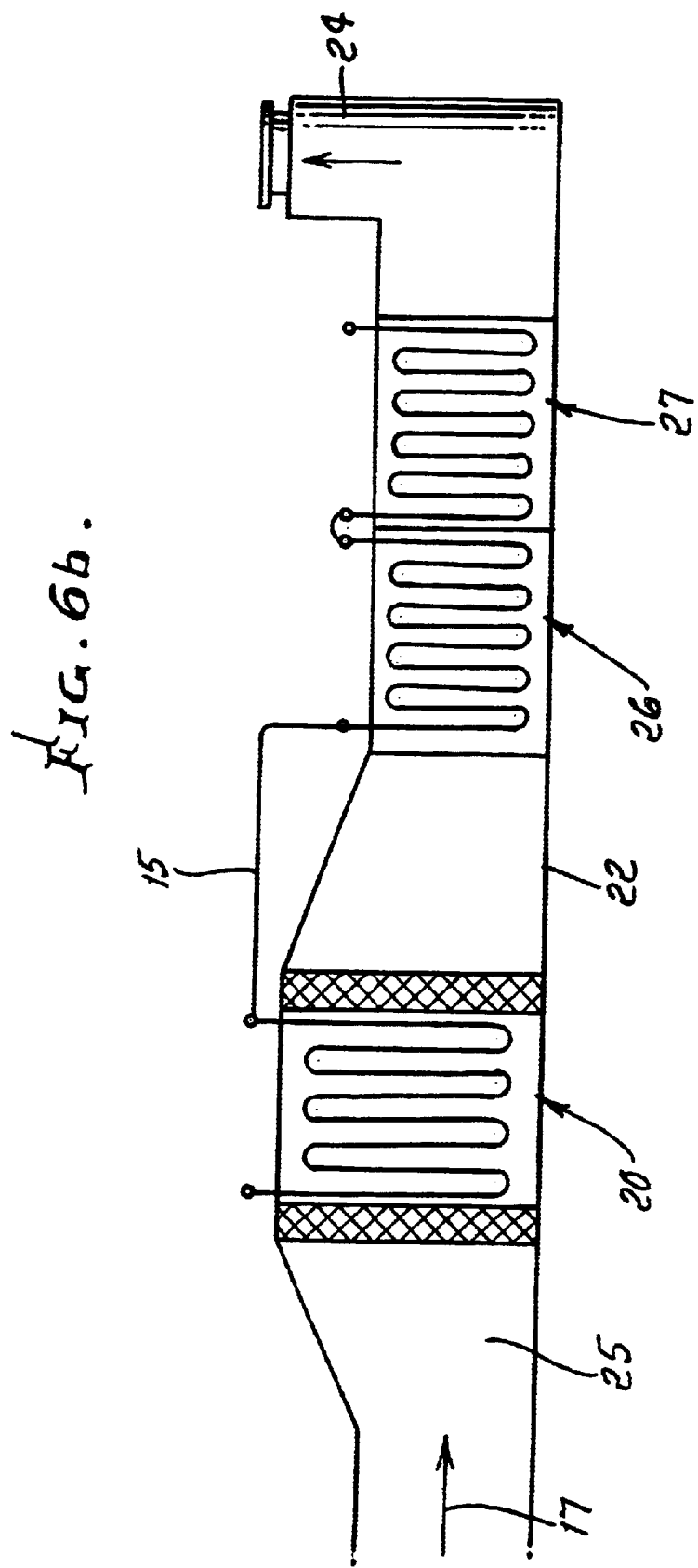

FIG. 1 is a heat transfer vs temperature diagram;
FIG. 2 is a temperature—entropy diagram;
FIG. 3 is a diagram showing a dual pressure steam bottoming cycle;
FIG. 4 shows a parallel path, waste heat system; and
FIG. 5 is heat transfer vs temperature diagram, for a parallel path heat exchanger; and
FIGS. 6a and 6b schematically show a parallel path heat exchanger having three segments suitable for a gas turbine exhaust, requiring catalysts, FIG. 6b taken at right angles to FIG. 6a.

DETAILED DESCRIPTION

FIG. 1 illustrates heat recovery limitation for a conventional steam cycle. A large difference between the exhaust temperature and steam temperature occurs at every point, particularly in the boiling region. The thermodynamic efficiency for an element of heat input, dQ, is given by:

$$\eta_1 = 1 - T_r/T_v$$

where $T_r$ is the heat rejection temperature and $T_v$ is the steam vapor temperature.

If power could be generated from the exhaust directly the thermodynamic efficiency would be:

$$\eta_2 = 1 - T_r/T_e$$

where $T_e$ is the exhaust temperature.

For the example shown, the exhaust temperature at the point shown could typically be 650° F. (1110° R) while the steam temperature is limited to 350° F. (810° R). The ratio of conversion efficiency to maximum conversion efficiency at this point is therefore:

$$\eta_1/\eta_2 = .333/.514$$

$$= .648$$

Thus 54% more power could be generated for the increment of heat at this particular point.

One way to have a system with the higher efficiency would be to heat liquid as shown in FIG. 1 and to provide a near isentropic two-phase expansion. This is illustrated in FIG. 2. For two-phase turbines an increase in power output of about 20% can be achieved compared to a two-stage flash steam turbine cycle. However, this cycle requires development of a new turbine type and involves a large recirculating water flow, producing high parasitic pumping loss.

Another approach is to increase the number of boiling stages (or pressures). This is illustrated in FIG. 3. The conversion efficiency can be higher but in order to make a significant efficiency gain, a large number of separate steam flows are required, leading to a complex heat recovery boiler with several boiler drums.

The new system of the present invention, the parallel path heat recovery system (PPHRS), improves the efficiency of power production while simplifying the heat recovery heat exchanger. The basic PPHRS cycle is illustrated in FIG. 4. Hot gas 16, such as exhaust gas from an engine or gas turbine or another source, enters a heat exchanger structure 17, and flows counter current to te flow of water and steam in heat exchanger structures, 3, 4, 5 and 6, which may include coils 3a, 4a, 5a and 6a. In the first segment, each coil intercepts a different fraction of the gas stream. The hot gas transfers heat to the coils and the cooled gas, leaves the heat exchanger structure at 18.

Cold water is split into several parallel flowstreams at 1. Any number may be used. Four are shown in this example. The flow rate of water and pressure in each flowstream is regulated by control valves 2, or positive displacement pumps. The flowstreams enter a heat exchanger structure 17, and flow through structures 3a, 4a, 5a and 6a located in the first segment, and which are typically parallel or substantially parallel to each other, each receiving heat from a given fraction of gas flow as long as they are in the first segment. After receiving heat in the first segment, the flow streams enter structures 3b, 4b, 5b and 6b in the second segment each receiving heat from a different fraction of the gas flow as long as they are in the second segment. The process continues through the third and fourth segments. The lowest pressure stream in duct 3, is heated and reaches its boiling point first. The flow is superheated to the desired temperature, leaves the heat exchanger structure and flows to the low pressure port 7, of a steam turbine 11. The remaining flows, in ducts 4, 5 and 6, flow in parallel, receiving heat simultaneously from the hot gases in structure 17. The next higher pressure stream 4, is vaporized and superheated and flows to the next higher pressure inlet port 8, of the steam turbine 11.

The remaining flows 5 and 6, flow in parallel, receiving heat simultaneously from the hot gas. The next higher pressure stream in duct 5, is vaporized and superheated, and flows to the next higher inlet pressure port 9, of the steam turbine. The remaining, highest pressure stream 10, flows through the last section of the heat exchanger, is vaporized and superheated. It leaves the heat exchanger and flows into the highest pressure port 10 of the steam turbine.

The unexpected result of having the flows in parallel or substantially in parallel in the interior of structure 17 is that by having several subcooled water streams absorbing heat while one stream is vaporizing, and by choosing the fraction of the exhaust gas stream transferring heat to each structure, the temperature difference at the pinch point may be increased. In any segment the percentage of the heat required for vaporization compared to that increasing the sensible heat of the liquid streams is reduced, producing a heating curve which is closer to that of the liquid curve or multiple flash curve of FIG. 1.

Another unexpected result is that by using multiple once through vaporization, multiple boiler drums are eliminated and the heat exchanger structure is simplified.

The highest pressure steam flow 10a, enters the turbine high pressure inlet port 10. The flow is expanded through turbine blades to the pressure of the second highest pressure flow 9a. The flows 10a and 9a, are mixed in the turbine and expanded together to the pressure of the third highest pressure flow 8a. The flows 10a, 9a and 8a, are mixed in the turbine and expanded together to the pressure of the lowest pressure flow 7a. The flows 10a, 9a, 8a and 7a, are mixed in the turbine and expanded to the turbine exhaust pressure at 19. Each of the four expansions produces shaft power in the turbine. Each of the mixing processes increases the dryness or superheat of the steam in the turbine, because the entering streams are all superheated. The result is a very high turbine efficiency compared to a turbine having only one or two inlet streams.

After leaving the turbine, the steam is condensed in a condenser 13. The resulting condensate is pressurized by a condensate pump 14, and then a high pressure feed pump 15. The feedwater is returned to the inlet manifold 20, where it is divided into the described parallel streams.

The heat exchanger profile was determined for an inlet gas temperature of 900° F. and an exit gas temperature of 230° F., the resulting profile being shown in FIG. 5. Also shown on FIG. 5 is the best single pressure steam turbine bottoming cycle for these conditions.

An analysis was done for a bottoming system for a Pratt & Whitney FT-8 gas turbine. The same assumptions were used as were previously considered in a study by Sargent & Lundy comparing a two-phase bottoming system to a dual pressure steam turbine bottoming system for the FT-8.

The results are summarized as follows: The PPHRS system generated 9670 kWe net output compared to 8160 kWe for the optimized double flash system, for an improvement of 18.5%. The PPHRS output is about equal to that of the two-phase system 9765 kWe, but there is no technology risk or new technology development required.

A physical arrangement to achieve these results is shown in FIGS. 6a and 6b.

The hot exhaust gas 18, from a gas turbine enters the heat exchanger body 25. A catalyst 19 to reduce carbon monoxide, may be provided. After leaving the carbon monoxide catalyst the hot gas enters a segment 20, of the parallel path heat exchanger structure. In the figure a single heat exchanger structure 16, is shown but it may be two or more.

After transferring heat to the first segment the hot gas can be ducted to a catalyst 21, to remove the oxides of nitrogen. After leaving the catalyst 21, the hot gas flows through a transition duct 22, to the next segment 26, of the PP Heat Exchanger. In this segment there are three heat exchanger structures 26a, 26b, and 26c, each intercepting a different fraction of the heat flow and each causing the internal fluids to flow generally parallel to each other in a direction counter-current to the exhaust gas stream.

After transferring heat to the heat exchanger structures in the second segment, the hot gas enters the third segment 27. In this segment there are three heat exchanger structures 27a, 27b and 27c each intercepting a different fraction of the hot exhaust gas, and a different fraction of the exhaust gas in segment 27 than was intercepted in segment 26.

The exhaust gas 23, leaving segment 27 has been cooled and leaves through the exhaust stack 24.

The fluid streams shown entering segment 27 are the low pressure stream 31, the medium pressure stream 36 and the high pressure stream 41.

In this example the low pressure stream 31 enters heat exchanger structure 27a of segment 27 and is vaporized and partially superheated.

The low pressure vapor 36 enters heat exchanger structure 26a, of segment 26. The heat exchanger structure is sized to intercept only the fraction of the exhaust gas required to superheat the stream to the desired temperature at 5.

The medium pressure stream enters heat exchanger structure 27b of segment 27. The heat exchanger structure is designed to intercept the fraction of the exhaust gas required to heat the stream to the required temperature at 8, but not enough to vaporize the medium pressure stream.

The medium pressure stream 8 enters heat exchanger structure 26b of segment 26. The heat exchanger structure is designed to intercept the fraction of the exhaust gas stream necessary to vaporize it and superheat it to temperature at 10. Both the low pressure stream at 5, and the medium pressure stream at 10, leave the heat exchanger body 25 and flow to a steam turbine, not shown.

The high pressure flow stream 41, enters heat exchanger structure 27c of segment 27. The heat exchanger structure is designed to intercept the fraction of the exhaust flow necessary to heat the high pressure liquid to temperature at 13.

The high pressure flow stream is ducted to heat exchanger structure 26c, of segment 26. The heat exchanger structure is designed to intercept the (different) fraction of the exhaust flow required to heat it to temperature at 15, but not enough to vaporize it.

The high pressure liquid, in this example, bypasses the $No_x$ catalyst 21 and enters heat exchanger structure 16 of segment 20. There it is vaporized and superheated to temperature at 17. It leaves the heat exchanger body and flows to the high pressure port of the steam turbine, not shown.

In the above FIG. 2 is a temperature—entropy diagram for an ideal two-phase cycle; FIG. 3 is a schematic showing a dual pressure steam bottoming cycle; and FIG. 5 is a diagram showing a parallel path heat exchanger profile.

The method of the invention basically comprises:
- a) providing a chamber having inlet and outlet porting for flow through of the engine hot exhaust gas, in the chamber interior,
- b) providing separate heat exchanger structures (for example ducts) in said chamber interior, to receive heat transferred from said exhaust gas, the structures receiving pressurized liquid for flow in different streams through the structures, to develop vapor at different pressures and temperatures without the use of boiler drums,
- c) the heat exchanger structures having outlets to communicate with a vapor driven turbine or turbines having inlets at different pressures.

I claim:

1. A hot exhaust heat recovery system comprising, in combination
   - a) means for forming a chamber having inlet and outlet porting for flow through of hot exhaust gas, in the chamber interior,
   - b) separate heat exchanger structures in said chamber interior, to receive heat transferred from the exhaust gas, said structures provided means for receiving pressurized liquid for flow in different paths there-through, and developing vapor streams at different pressures and temperatures without use of boiler drums, said structures having different sizes in the chamber interior and have undulant passages therein,
   - c) the structures having outlets to communicate with a vapor driven turbine or turbines having inlet ports at different inlet fluid pressure zones.

2. The combination of claim 1 wherein said structures are at successively lower temperatures.

3. The combination of claim 1 wherein said zones are at successively lower pressures, and said vapor streams are at successively lower pressures and are supplied respectively to successively lower pressure zones of the turbine or turbines.

4. The combination of claim 1 wherein said structures extend substantially in parallel in said chamber interior.

5. The combination of claim 1 including a source of said hot gas communicating with said inlet porting.

6. The combination of claim 5 wherein said source is an internal combustion engine, and said gas is hot exhaust gas from said engine.

7. The combination of claim 5 wherein said source is a gas turbine exhaust, and said gas is hot exhaust gas from the turbine.

8. The combination of claim 1 wherein there are ducts that have inlets to which fluid discharged from the turbine is fed.

9. The combination of claim 8 wherein said fluid is water.

10. The hot exhaust heat recovery system comprising, in combination
    - a) means for forming a chamber having inlet and outlet porting for flow through of hot exhaust gas, in the chamber interior,
    - b) separate heat exchanger structures in said chamber interior, to receive heat transferred from the exhaust gas, said structures providing means for receiving pressurized liquid for flow in different paths there-through, and developing vapor streams at different pressures and temperatures without use of boiler drums,
    - c) the structures having outlets to communicate with a vapor driving turbine or turbines having inlet ports at different inlet fluid pressure zones,
    - d) and wherein said structures are located to each intercept a different fraction of the hot gas stream to provide the required heat to produce required conditions into the exits of the structures.

11. A hot exhaust heat recovery system comprising in combination
    - a) means for forming a chamber having inlet and outlet porting for flow through of hot exhaust gas, in the chamber interior,
    - b) separate heat exchanger structures in said chamber interior, to receive heat transferred from the exhaust gas, said structures providing means for received pressurized liquid for flow in different paths there-through, and developing vapor streams at different pressures and temperatures without use of boiler drums,
    - c) the structures having outlets to communicate with a vapor driven turbine or turbines having inlet ports at different inlet fluid pressure zones,
    - c) and wherein said structures extend generally longitudinally in the chamber, and each intercepting a different fraction of the hot exhaust gas.

12. A hot exhaust heat recovery system comprising, in combination
    - a) means for forming a chamber having inlet and chamber interior,
    - b) separate heat exchanger structures in said chamber interior, to receive heat transferred from the exhaust gas, said structures providing means for receiving pressurized liquid for flow in different paths there-through, and developing vapor streams at different pressures and temperatures without use of boiler drums,
    - c) the structures having outlets to communicate with a vapor driven turbine or turbines having inlet ports at different inlet fluid pressure zones,
    - d) and wherein said structures have different longitudinal lengths and widths, in said chamber interior, and have coils along their lengths.

13. A hot exhaust gas heat recovery system comprising, in combination
    - a) a structure forming a chamber having inlet and outlet porting for flow through of hot exhaust gas, in the chamber interior,
    - b) separate heat exchanger structures in separate zones which are sequential in the direction of flow of the exhaust gases, said heat exchanger structures receiving liquid or vapor for flow in different paths there-through, to develop vapor streams at different pressures and temperatures without use of boiler drums,
    - c) wherein said heat exchanger structures are located to each intercept a different fraction of the hot gas stream to provide the required heat to produce the required condition at the exist of the heat exchanger structures, d) wherein said heat exchanger structures have outlets to communicate with a vapor driven turbine or turbines having inlet ports requiring different inlet fluid pressures wherein said inlet fluid pressures are at successively lower pressures corresponding to the pressures produced by the separate heat exchanger structures.

14. The combination of claim 13 wherein there are more than one heat exchanger structure in each zone and extending longitudinally in the zone, each intercepting a different fraction of the hot exhaust gas.

15. The combination of claim 13 wherein said structures have different longitudinal lengths and widths in said chamber interior and have coils or plate-fin heat exchanger passages along their length.

* * * * *